United States Patent Office 3,495,478
Patented Feb. 17, 1970

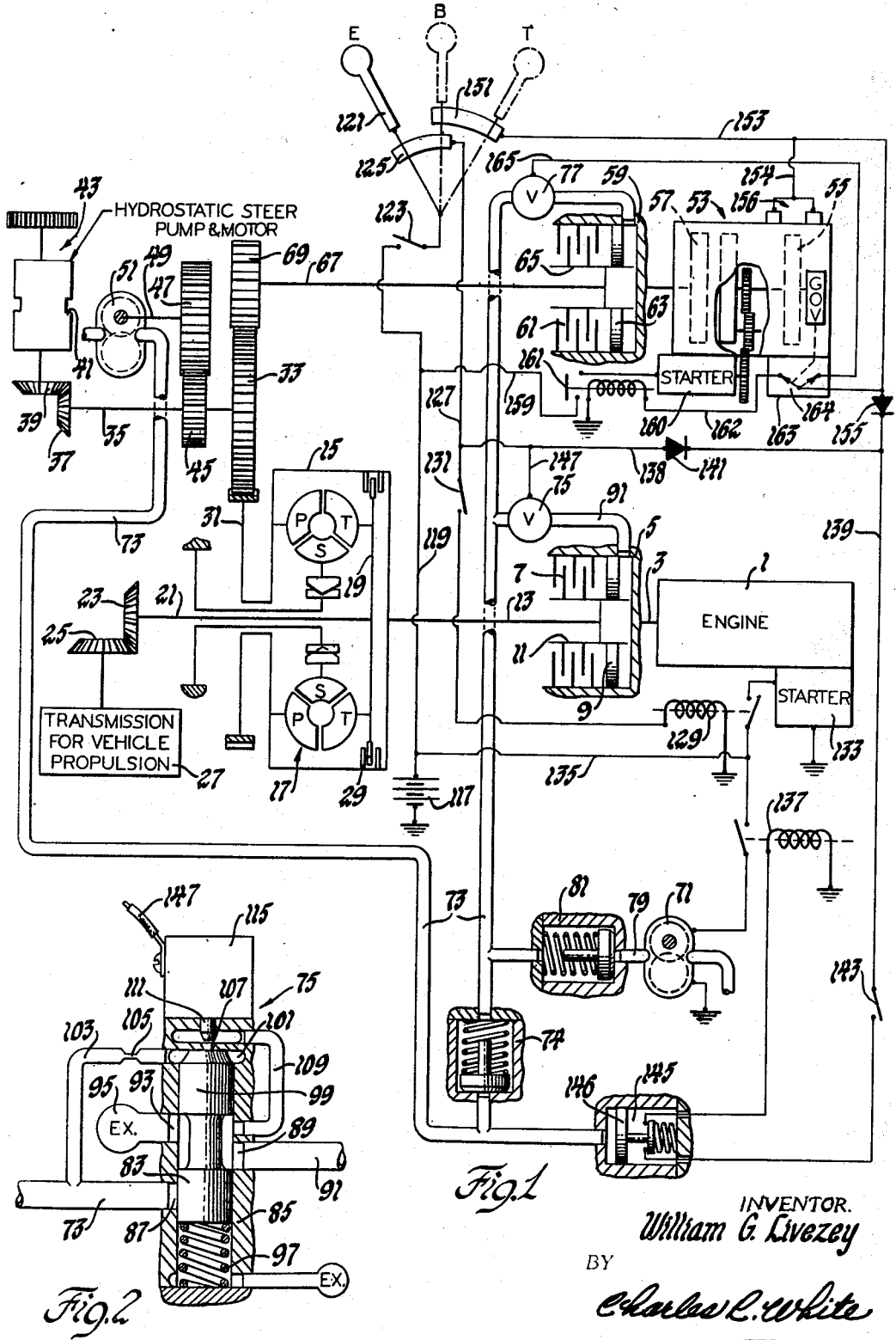

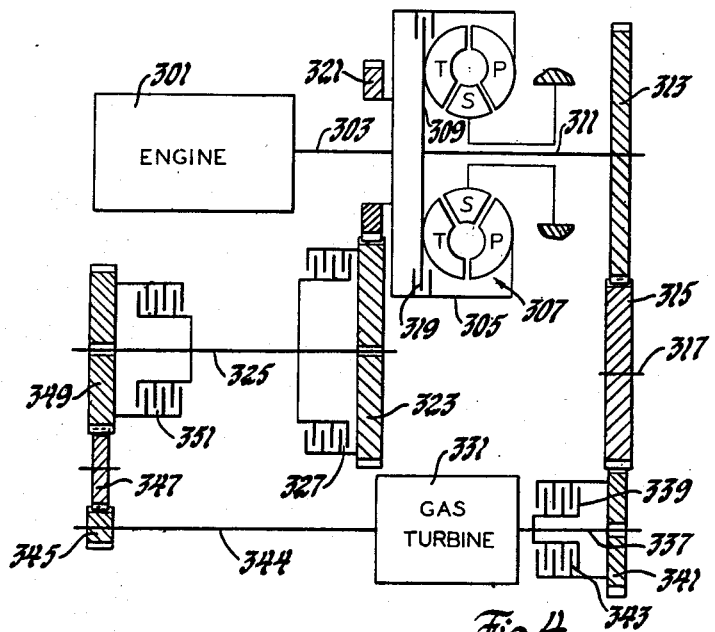

3,495,478
POWER BOOST SYSTEM
William G. Livezey, Indianapolis, Ind., assignor to General Motors Corporation, Detroit, Mich., a corporation of Delaware
Filed Jan. 22, 1968, Ser. No. 699,566
Int. Cl. F16h 37/06
U.S. Cl. 74—661   12 Claims

ABSTRACT OF THE DISCLOSURE

Dual engine power system for driving a power transmission in which there is one main engine having good fuel economy used for normal vehicle operation and an auxiliary turbine engine having high power to size weight ratio used for power boost to increase vehicle performance. Controls are provided for starting either engine independently, for allowing the push start of either engine, for starting either engine by the other engine, and for starting and clutching the turbine engine to the transmission drive quickly and easily while the vehicle is being operated by the main engine. Preferably, the controls include an electrically driven pump which intially pumps fluid to engine power clutches through selectively operated clutch control valves until an engine driven input pump can supply the clutch operating fluid. Mechanical controls for engine selection are also provided in another embodiment.

---

This invention relates to power boost systems for driving a transmission and more particularly to a dual engine power boost system, including controls, in which one of the engines is normally utilized to power the transmission and the other of the engines is utilized to provide power boost when vehicle performance is desired.

This invention is particularly useful in forming a power boost for larger and heavier vehicles such as tracked vehicles and preferably employs different types of engines to provide a highly advanced power package for vehicle propulsion and to provide a drive to a vehicle steering system. Accordingly, a reciprocating engine such as a diesel, noted for good fuel economy and performance, may be used for normal vehicle propulsion and a gas turbine engine, noted for low weight, small size and good performance characteristics, may be used with the diesel for outstanding vehicle performance. In case of diesel engine stoppage the vehicle remains operative with the use of the gas turbine. With this system there is the capability of at least one engine starting the other and tow start another of the engines.

Either or both of the engines are capable of driving an input pump for charging a hydraulic system forming part of the controls of this invention. These controls allow a vehicle operator to select and start either one or both engines and selectively couple the output of the engines to torque transmitting structure which includes provision for combining the outputs of both of the engines.

It is an object of this invention to provide an advanced multi-engine power system in which output of either one or both of the engines may be ultilized to drive system output and in which one of the engines may be utilized to start another of the engines.

Another object of this invention is to provide a dual-engine power system for vehicles including a gas turbine in which the output of either one or both of the engines is routed to a hydrodynamic unit for driving a vehicle transmission and is routed to a steering system drive in series with the transmission drive.

Another object of this invention is to provide a dual-engine power system for a vehicle including advanced controls for selecting and starting, including cold starting, of either one or both of the engines and for coupling the output of either one or both engines into a power combining structure for driving system output.

Another object of this invention is to provide a dual engine, power boost system for vehicles including an improved control system for selecting and starting either or both engines with the controls including a first fluid pump to initially supply operating fluid to a power clutch control system for the engines and a second fluid pump driven by at least one of the engines to subsequently supply operating fluid to the power clutch control system and to automatically stop operation of the first fluid pump.

Another object of this invention is to provide a control system for a dual engine, power boost system for vehicles including improved electrical circuitry conditionable to start either or both of the engines and including one-way means for preventing energization of a circuit for one engine upon energization of the circuit for another engine.

Another object of this invention is to provide a gas turbine and reciprocating engine power boost system in which either engine may be self started, started by the other engine or tow started.

Another object of this invention is to provide a dual engine, power boost system including a gas turbine for vehicles in which a power transmission input is driven by either one or both of the engines and in which accessories are driven by the gas turbine gasifier shaft when the gas turbine is operating alone but only by the other engine when the other engine is operating alone or in conjunction with the gas turbine to drive the output.

Another object of this invention is to provide improved controls for a dual engine power boost system incorporating a first control in which either or both engines may be selected and started and incorporating a second control operated by a first engine torque demand control for starting a second engine for power boost.

These and other objects of this invention will become more apparent from the following detailed description and drawings in which:

FIGURE 1 is a diagrammatic view of a dual-engine power system including controls for selecting and starting the engines and for effecting connection of either one or both engines to a transmission input;

FIGURE 2 is a sectional view of a control valve used in control of the engine power clutches of the FIGURE 1 embodiment;

FIGURE 4 is a diagrammatic view of a third embodiment of the invention;

FIGURE 5 is a diagrammatic view of a fourth embodiment of the invention.

Figure 3:
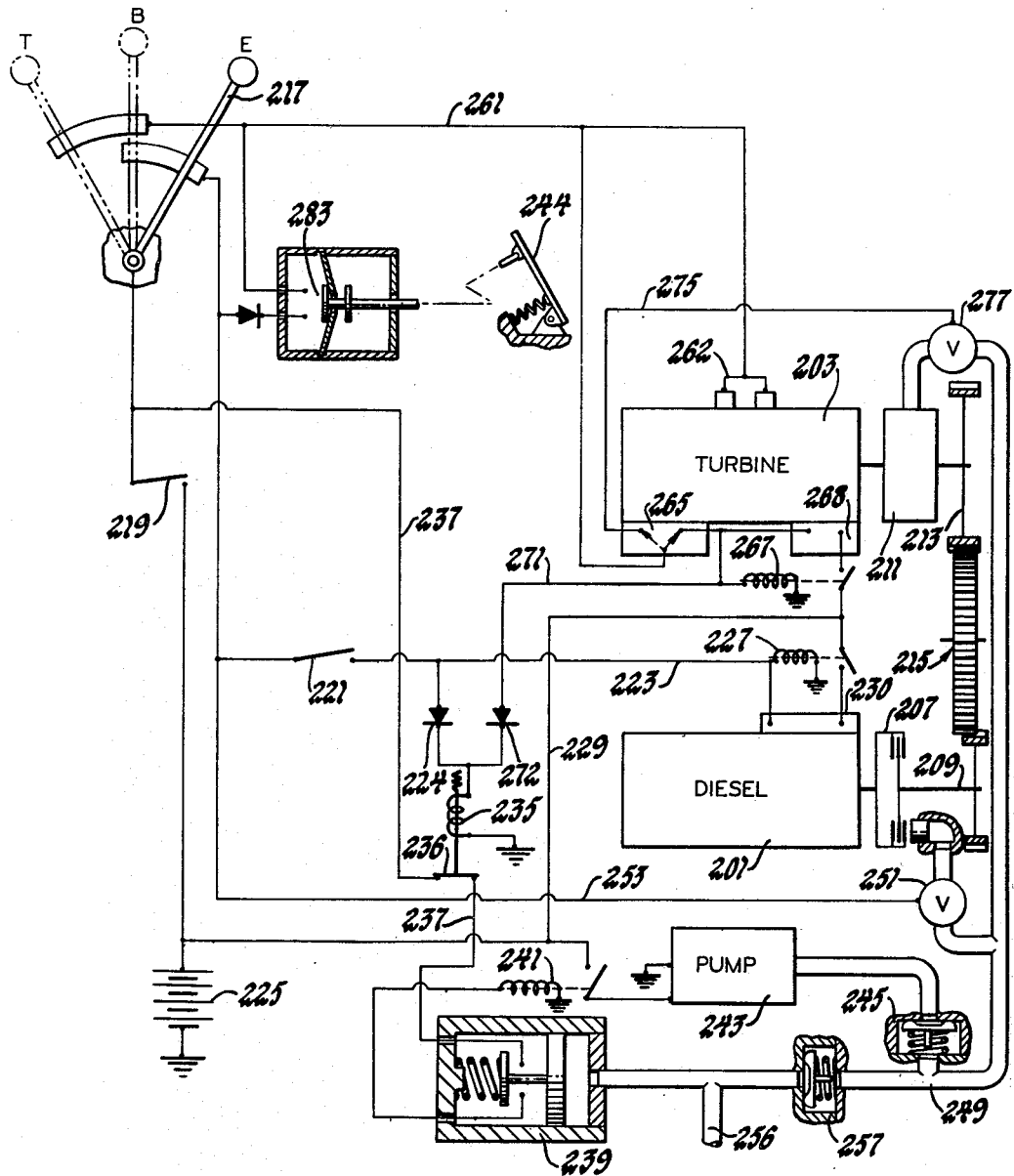
FIGURE 3 is a diagrammatic view similar to FIGURE 1 illustrating a second embodiment of the invention.

As shown in FIGURE 1, there is a diesel engine 1 having an output shaft 3 connected to drive drum 5 which houses a diesel engine power clutch formed by a multiplate clutch pack 7 and apply piston 9. The driven plates of the clutch pack are splined to a hub 11 of a drive shaft 13 which is coupled to a torque converter housing 15.

Located interiorly of this housing is a hydrodynamic torque converter 17 having pump P, turbine T and grounded stator S. The pump P is connected to the housing 15 and both will be driven simultaneously by the shaft 13. The turbine T is connected through a disc 19 to a drive shaft 21. This drive shaft drives meshing gears 23 and 25 which provide an input for a vehicle cross-drive transmission 27 which may be of any suitable type.

A converter lockup clutch 29 is selectively engageable to connect the converter turbine T to the housing 15 for direct mechanical drive of the shaft 21 and transmission 27. The converter housing carries an exterior spur gear 31 that drives spur gear 33 which is connected by shaft 35 to drive meshing bevel gears 37 and 39. Bevel gear 39 drives a pump 41 of a hydrostatic steer pump and motor system 43. Another spur gear 45 securely mounted on shaft 35 meshes with spur gear 47 to drive power takeoff shaft 49. Shaft 49 drives accessories such as generator and cooling fan not illustrated, and an input pump 51 which operates to pump fluid into the hydraulic clutch control system which will be later described. From the above it will be appreciated that the diesel can drive the cross-drive transmission, the steer system and the accessories.

Also shown in FIGURE 1 there is a gas turbine engine 53 having a gasifier section 55 and a power turbine section 57 such as that described and disclosed in United States Patent No. 3,266,248 to K. G. Leslie and United States Patent No. 3,093,010 to William M. Spreitzer et al. The power turbine has an output shaft that is connected to drive the drum 59 which houses a gas turbine power clutch formed by a multiplate clutch pack 61 and apply piston 63. The driven plates of this clutch pack are splined to a hub 65 of a drive shaft 67 which drives a speed reducing gearing provided by a spur gear 69 and meshing spur gear 33 which meshes with the torque converter housing spur gear 31 to permit the gas turbine to drive the torque converter housing and the cross-drive transmission as well as the hydrostatic pump of the steer pump and motor system 43. Also since the gas turbine drives shaft 35, the power takeoff spur gears 45 and 47 will be driven to drive the power takeoff shaft 49 and input pump 51.

From the above it will be readily understood that the vehicle can be driven by either the diesel 1 on application of the diesel power clutch or by the gas turbine on application of the gas turbine power clutch; for economy purposes the vehicle will normally be driven by the diesel. To increase vehicle performance and provide for power boost, the output of the gas turbine engine is added to the output of the diesel engine by applying the gas turbine clutch and maintaining the engagement of the diesel engine clutch.

Routing the gas turbine power through the hydraulic torque converter is highly beneficial since the converter not only multiplies gas turbine input torque for adequate starting torque and provides good economy in lockup operation, but also permits the gas turbine engine to drive the hydrostatic steer pump for pivot steer in tracked vehicle application when the tracks of the vehicle are stalled. Also, at low vehicle speed the torque converter facilitates operating the gas turbine engine at speeds appropriate for accessories such as electric generators and hydraulic pumps.

The diesel engine power clutch and the gas turbine power clutches are engaged by fluid under pressure from the input pump 51 or from an electrically-operated pump 71.

As shown, a conduit 73 leads from the input pump 51 through a one-way valve 74 to control valve 75 for the diesel power clutch and to control valve 77 for the gas turbine power clutch. The pump 71 has an output conduit 79 connected into the conduit 73 through a one-way valve 81 upstream of the one-way valve 74.

The power clutch control valves 75 and 77 are identical and therefore only one will be described in detail. FIGURE 2 illustrating control valve 75 for the diesel engine clutch has a valve member 83 with spaced lands shiftably mounted within a ported housing 85. Conduit 73 is connected to the port 87; port 89 is connected to a conduit 91 leading to the piston apply chamber for the diesel power clutch; and port 93 is connected to an exhaust 95. The valve member is biased upwardly toward a clutch exhaust position by a coil spring 97 and downwardly toward a clutch apply position by fluid pressure in control chamber 101 acting upon the end of upper land 99.

As shown, the control chamber 101 is formed in the end of the housing 85 and is connected to conduit 73 by branch 103 having restriction 105. Chamber 101 has a control orifice 107 connected to exhaust by the conduit 109 and through the valve housing as shown. The orifice 107 is opened or closed by operation of a plunger 111. Plunger 111 is biased upwardly to open an orifice by a spring, not shown, and downwardly by energization of a solenoid 115 through electrical control circuitry.

Electrical controls are provided to allow an operator to select and start either or both of the engines and to operate the power clutches.

As shown in FIGURE 1, battery 117 is connected by a conducting line 119 to a pivotally mounted selector lever 121. A master switch 123 is connected in series in this line. A lever contact 125 is connected by a line 127 including a diesel start switch 131 to a grounded coil of relay 129. The diesel starter 133 is connected to the battery by a circuit formed by line 135 connected into the battery line 119 and the relay 129.

The electrically-operated hydraulic pump 71 is connected to the battery by a circuit formed by line 135 connected into the battery line 119 and a relay 137. The coil of relay 137 is connected to the battery by a circuit including line 119, selector lever 121, contact 125, line 127, line 138 connected into line 127, diode 141 and line 139. Cold start switch 143 and pressure switch 145, having pressure responsive piston 146, are connected in series in line 139 as shown. The solenoid 115 for clutch control valve 75 is connected to line 138 by line 147.

A second contact 151 for lever 121, positioned in offset and overlapping relationship with respect to contact 125,, is connected by line 153 including diode 155 to the line 139 and by this latter line to the coil of pump control relay 137 to provide a circuit to energize the relay coil and complete the circuit through line 135 to operate pump 71. Line 154 leads from line 153 to gas turbine ignition and fuel control 156 as illustrated. A circuit including line 159 to the gas turbine starter 160 through the relay 161 is completed by energization of the relay coil. As shown, this relay coil is connected to line 153 by line 162 and automatic switch 163. The contact 164 of the automatic switch is operated by a gasifier-driven governor not shown which moves the contact to the phantom line position when the gas turbine reaches a self-sustaining speed to complete a circuit through lines 153 and 165 to the turbine clutch valve solenoid to cause engagement of the gas turbine power clutch.

To select and start the diesel engine the selector lever is moved to the position E and the master switch 123, the diesel starter switch 131, the cold start switch 143 and the pressure switch 145 are closed. With the circuitry in this condition, current through the master switch energizes the diesel engine clutch valve 75 and passes through diode 141, cold start switch 143, pressure switch 145 and the coil for relay 137. The circuit to the electric pump 71 is then completed. This pump then supplies fluid through the one-way 81 to conduit 73. Since the solenoid of valve 75 is energized, the valve element moves to the clutch apply position and pressure fluid passes through the valve 75 to cause engagement of the diesel engine clutch. When the diesel power clutch is applied, the transmission input system is activated along with the input fluid pump 51. The input pump supplies pressure to maintain the engagement of the clutch; input pump pressure also breaks the contact of the pressure switch 145 to break the circuit to the electric pump. The vehicle is now in condition to be driven by the diesel. Diode 155 blocks energization of the gas turbine control circuitry through the diesel engine circuitry.

It will be understood that the closing of the engine starter switch 131 energizes the coil of relay 129 to start the diesel. After the diesel has started, the diesel starter switch will then be opened to cut off the starter 133. After starting, the diesel is operated by conventional controls not illustrated.

If it is desired to operate both the diesel and the gas turbine engines simultaneously for power boost, the selector lever is moved to the position B. This would energize the turbine electrical system which would energize the turbine starter through the automatic switch 163. After attaining cranking speed, the automatic switch would disconnect the starter 160 and energize the turbine clutch valve 77, thus connecting the power turbine to the input gear train 69 and 33. After starting, the gas turbine is operated by the vehicle operator by suitable controls not illustrated.

To operate the gas turbine engine alone, the selector lever is moved to position T. Upon closing of the master switch 123, the turbine would start automatically as previously described. The diode 141 blocks energization of the diesel engine circuitry through the gas turbine circuitry.

To start the diesel engine with the gas turbine, the selector lever is moved to the position B. Upon closing of the master switch 123, the turbine would start automatically as described and after reaching cranking speed the gas turbine power clutch would engage and start cranking the diesel engine.

For cold starting the cold start switch 143 is open. This relieves the battery 117 of the electric pump load and relieves the engine starter 133 of the transmission input gear train load since the engine clutch would not be engaged. After starting the engine, the cold start switch is closed, causing the clutch to engage for the diesel or the gas turbine whichever one is utilized to drive the input gear train. If desired, the cold start switch can be made to cut out automatically when either starter is engaged.

By the addition of a power transmission from the accessory drive spur gear 47 to the gasifier 55 and a clutch, the diesel can be utilized to start the gas turbine by driving the accessory drive spur gear and the added power transmission to bring the gasifier up to a self-sustaining speed.

Power modulation of the two engines may be accomplished by suitably torque demand controls such as a throttle pedal and throttle linkage connected to each of the engines.

FIGURE 3 illustrates a control system similar to that of FIGURE 1 but incorporates an additional control operated by a throttle control when high vehicle performance is demanded. In FIGURE 3 there is a diesel 201 and gas turbine 203. The diesel power clutch 207, when engaged, connects the output of the diesel to system output 209 which provides input to a vehicle power transmission not illustrated. Gas turbine power clutch 211, when engaged, connects gas turbine output to the input gear 213 of a transfer gear train 215 having a gear secured to the output 209 to permit the gas turbine engine to drive the output 209 alone or in conjunction with diesel engine drive.

This system utilizes starters for the diesel engine and gas turbine, an automatic switch for cutting off the gas turbine starter after the gas turbine obtains a self-sustaining speed, an electrically driven pump for initially supplying fluid for the power clutches 207 and 211, power clutch valves 251 and 277, and a selector lever 217 which corresponds to similar parts described in connection with the FIGURE 1 embodiment.

The diesel engine 201 is selected and started by placing the selector lever 217 in the position E and closing the master switch 219 and diesel starter switch 221. This completes a circuit 223 from the battery 225 to the coil of relay 227, and the relay closes to connect battery line 229 to the starter 230 which operates to start the diesel engine. When the diesel starter control circuit 223 is energized, current flows through diode 224 to the coil of relay 235. Energization of this relay coil opens the normally closed switch 236 to break the circuit 237 through the closed pressure switch 239 to the relay 241 so that the electric pump 243 will not operate. This is beneficial in that the diesel engine does not have to drive the output shaft when being started.

After the diesel engine is operating with its power modulated by the throttle control 244, the engine starter switch is opened; and the coil of relay 235 is de-energized. The switch 236 closes to complete the circuit 237 to the relay 241 which energizes to complete a circuit to the electric pump 243. The pump 243 then pumps fluid through a one-way valve 245 and into a conduit 249 to an engine clutch valve 251 which is like the clutch control valve illustrated in FIGURE 2. The solenoid of this clutch control valve is energized by completion of the circuit 253 through the master switch and selector lever switch.

Valve 251 then connects conduit 249 and clutch 207 so that pressure fluid from the pump 243 can effect engagement of the diesel power clutch 207 and the diesel will drive the output 209. An input pump similar to pump 51 of FIGURE 1 is driven by output 209 to supply fluid through conduit 256 into the conduit 249 through the one-way valve 257 and into the diesel power clutch 207 through the clutch valve 251. The pressure switch 239 connected to the conduit 249 responds to this pressure to break the circuit to the relay 241. When de-energized, the relay will break the circuit to the electric pump 243 which then stops.

To operate on turbine engine alone the selector lever is moved to position T and master switch 219 is closed. This completes a circuit 261 from the battery to the ignition and fuel control 262 and to the coil of relay 267 through the automatic switch 265. When this relay coil is energized, the relay closes to connect the turbine starter 268 to the battery line 229. The starter operates to drive the gasifier of the gas turbine up to a speed in which it is self-sustaining. When the starter is starting the gas turbine, the turbine power clutch 211 is not applied since the electric pump 243 is not operating. This is because a circuit 271 including diode 272 to the coil of relay 235 is completed to release switch 236 to break the circuit 237 for the electric pump relay 241.

As soon as the gas turbine is self-sustaining a governor similar to that of FIGURE 1 driven by the gasifier will actuate the automatic switch to move the contact to the phantom line position illustrated. When this occurs, a circuit 275 to the turbine clutch valve 277 is completed. This valve is also the same as that illustrated in FIGURE 2. When the solenoid of valve 277 is energized, the fluid from the electric pump 243 is supplied into conduit 249 through the valve 277 and into the gas turbine power clutch 211. When this clutch is engaged, the gas turbine engine will drive the output 209 and the input pump referred to above. The input pump functions as previously described in connection with the diesel engine to subsequently supply pressure fluid into line 249 and to the pressure switch 239 to break the circuit to pump relay 241 and thereby effect stoppage of the electric pump. To obtain gas turbine power boost with the diesel operating, the selector lever 217 may be moved to the position B; or with the selector lever at position E, the throttle pedal 244 may be pushed down to a full throttle position to actuate switch 283 to complete the circuit 261 leading to the automatic switch 265 and the gas turbine starter. After the gas turbine becomes self-sustaining the starter automatically disengages by operation of the automatic switch 265 as described above and hydraulic pressure is allowed to engage the gas turbine power clutch 211 as previously described. When this clutch is engaged, the gas turbine will provide the desired power boost for added power into output 209. After the desired power boost is obtained by throttle pedal action, the turbine will automatically stop when the pedal is released sufficiently to deactivate switch 283.

To employ the turbine for cold starting the diesel, the selector lever is placed in the position B and the master switch is closed. The turbine starts first and after it becomes self-sustaining, the automatic switch moves to the phantom line position so that the electrically operated pump 243 can operate to furnish operating fluid to the power clutches through the power clutch valves to effect engagement of the power clutches for both engines. As both the gas turbine and diesel power clutches are engaged, the turbine can operate through the gears 215 to crank the diesel. Once the diesel is started, the selector lever is moved back to the position E; and the operation of the turbine is stopped.

Another embodiment of the power boost system is shown in FIGURE 4. This construction includes a diesel engine 301 which as an output 303 connected to housing 305 for hydrodynamic torque converter 307. The torque converter has pump P connected to and driven by the housing 305, turbine T and grounded stator S. The converter turbine is connected by disc 309 to a drive shaft 311 which in turn drives spur gear 313. This spur gear meshes with an output spur gear 315 to which is secured an output drive shaft 317 that provides an input into a vehicle propulsion transmission such as transmission 27 described in connection with the first embodiment. A selectively engageable lockup clutch 319 is operative to connect the converter housing to the turbine driven disc 309 for direct mechanical drive of the drive shaft 311. As shown, the housing 305 carries a spur gear 321 which meshes with an accessory drive spur gear 323 which is connectable with the accessory drive shaft 325 upon application of multiplate clutch 327. This output shaft also drives an input pump, such as pump 51 illustrated in FIGURE 1, which pumps operating fluid into a control system not shown for selectively applying the various clutches of this embodiment. In this embodiment the power turbine of the gas turbine engine drives an output shaft 337 which is connected to drive a drum 339 which may be selectively connected to spur gear 341 by application of clutch 343. Spur gear 341 meshes with the output spur gear 315 to provide speed reduction when the gas turbine drives the output shaft 317.

Leading from the gasifier of the gas turbine is a drive shaft 344 that drives a spur gear 345 near one end thereof. This spur gear drives an idler 347 and an accessory drive spur gear 349. These spur gears provide a speed reducing gear train to allow the gasifier to drive the accessories. As illustrated, the accessory drive spur gear 349 may be selectively coupled to the accessory drive shaft 325 upon application of multiplate clutch 351.

The diesel is used for normal vehicle operation with clutch 327 applied for accessory drive by the diesel. For power boost the gas turbine is started and its power is added to the output shaft 317 by applying gas turbine power clutch 343. Since clutch 351 is not engaged at this time only the diesel drives the accessories. For gas turbine operation alone, power clutch 343 is engaged for driving output shaft 317 by the power turbine, and clutch 351 is engaged for accessory drive by the gasifier of the gas turbine.

In this design both engines may be started by starter motors not illustrated, tow started or started by the other engine. To enable the diesel to start the gasifier section of the power turbine, the clutches 327 and 351 are engaged and the diesel drives the gasifier section through the accessory drive shaft 325 until the gasifier obtains a self-sustaining speed. Clutch 351 may then be released. As in the first embodiment of this invention, the gas turbine may be used to start the diesel through the power train provided gears 341, 315 and 313.

Turning now to the embodiment of the invention illustrated in FIGURE 5, the diesel engine 401 has an output shaft 403 connected to a housing 405 for a hydrodynamic torque converter 407 having pump P, turbine T and stator S. The torque converter turbine drives a shaft 409 having a jaw clutch 411 slidably mounted thereon. By shifting operator rod 413 and connected shift fork 415 to the left, the external teeth on the jaw clutch 411 will mesh with internal teeth on the spur gear 417 to selectively couple this spur gear to the drive shaft 409. Spur gear 417 meshes with idler 419 which in turn meshes with an output spur gear 421 allowing the diesel to drive a transmission input shaft 423. This shaft is connected by suitable means to a transmission such as the transmission 27 of the FIGURE 1 embodiment. Converter lockup clutch 424 is provided for direct drive of the transmission input shaft 423.

From the above it will thus be understood that the diesel engine is capable of driving the transmission through the torque converter or by a direct mechanical drive.

Movement of the operator rod 413 to the above mentioned first position to clutch the diesel to the transmission also moves the shift fork 425 to the left. This shift fork moves the jaw clutch 427 which is splined to the accessory drive shaft 429. This causes the external teeth 431 of the jaw clutch to mesh with corresponding internal dog teeth 432 of the spur gear 433. As shown, this spur gear is driven by the converter housing spur gear 435 through an idler 437. The diesel will then drive the accessory drive shaft 429 by a power path through the torque converter housing 405 and through the spur gearing and jaw clutch 427.

In addition to the engagement of the clutch teeth 431, the external teeth 439 of the jaw clutch meshingly engage the internal dog teeth 440 of a sleeve shaft 441 which is connected with the spur gear 443. Spur gear 443 meshes with a spur gear 445 which drives the input pump 447.

For power boost as in the previous embodiments, the output of a gas turbine engine may be utilized in conjunction with diesel 401 to drive the output shaft 423. As in the other embodiments, this gas turbine 451 has a gasifier and a power turbine. The power turbine drives a shaft 457. A gas turbine power clutch 459 is selectively engageable to connect drive shaft 457 with a spur gear 461 which drives idler 463 and output spur gear 421 to drive the output shaft 423. As shown, this gear train is a speed reducing gear train to allow the transmission to effectively utilize gas turbine output.

For gas turbine operation along the rod 413, shift fork 425 and jaw clutch 427 are moved to the right to a second position. This movement of the clutch 427 causes the external teeth 467 of the jaw clutch to engage the internal teeth of the output gear 421 to couple the accessory drive shaft 429 to the gas turbine output while disengaging the other jaw clutches and releasing the diesel engine of its load.

The gasifier of the gas turbine drives a shaft 470 and spur gear 471 which meshes with a gear 473 providing speed reducing gearing. Gear 473 drives shaft 475 which is connected to drive pump 477. This pump, when driven, pumps fluid from sump 479 to a clutch apply chamber 481 to move clutch apply piston 483 to engage clutch pack 485. Engagement of the clutch pack permits the gasifier driven spur gear 487 to drive meshing spur gear 488 and sleeve shaft 441. Accordingly, by the engagement of this latter clutch the gasifier drives the input pump.

The output of pump 477 is also connected to a combination regulating and knockdown valve 489. As shown, this valve has a movable valve element 490 in axial alignment with one end of the shift rod 413. When the gas turbine is operating alone, the valve 489 acts as a pressure regulator and pump 477 will supply a regulated pressure into the piston apply chamber 481 to apply clutch 485 and permit the gasifier to drive the accessories and input pump. However, when the control rod is shifted to the left for diesel or combined diesel and gas turbine power, the end of the rod will contact the valve element 490 and shift it against the bias of the spring 491 and open the output of pump 477 to exhaust 493. Since the pump 477 and clutch apply chamber 481 are open to exhaust, the gasifier turbine is disconnected from the accessory and input pump 447 drives. This is highly beneficial in that the load is taken off of the gasifier in power boost operation. As pointed out above, the accessories and input pump 447 are driven solely by the diesel at this time.

With this arrangement both engines may be self started through the use of starter motors not shown. The diesel can be started by towing or by the power turbine of gas turbine driving the diesel through a power path including drive shaft 409 and lockup clutch 424.

It is also contemplated that the gas turbine may be tow started or started by the diesel. Accordingly, control rod 413 can be shifted to the left so that the jaw clutch connects the diesel drive torque converter housing to the input pump drive sleeve shaft 441. The clutch 485 may be engaged by any suitable means not shown such as by connecting the output of input pump directly into the apply chamber of clutch 485 through an open on-off valve. The diesel can then bring the gas turbine gasifier up to a self-sustaining speed and the on-off valve can then be closed. Tow starting may be similarly accomplished by engaging converter lockup clutch and driving the gasifier by driving output shaft 423.

The detailed description of several embodiments of the invention for the purpose of explaining the principles thereof is not to be considered as limiting the invention since many other embodiments and modifications may be made within the scope of the invention by the exercise of skill in the art.

I claim:

1. In combination, power transmission means for a vehicle including a transmission for vehicle propulsion and including a vehicle steering drive, first and second engines, separate torque transmitting means for transmitting torque from each of said engines, torque combining means operatively connected to said separate torque transmitting means for combining the output torque of said engines, a hydraulic drive unit having an input rotor operatively connected to said torque combining means and having an output rotor operatively connected to said transmission for vehicle propulsion, and additional torque transmitting means operatively connected to said torque transmitting means for one of said engines and operatively connected to said torque combining means for drivingly connecting said separate torque transmitting means to said vehicle steering drive to thereby permit vehicle steering under predetermined transmission operating conditions including a transmission stall condition of said transmission for vehicle propulsion.

2. The combination of claim 1, and further including selectively engageable clutch means operatively connected in each of said separate torque transmitting means, and control means operatively connected to each of clutch means conditionable to effect the engagement of either of said clutch means for drive of said transmission and said vehicle steering drive by either of said engines and further conditionable to effect the engagement of both of said clutch means to enable both of said engines, to drive said transmission for power boost.

3. The combination of claim 1 and further including selectively engageable clutch means operatively connected in each of said separate torque transmitting means, hydraulically actuatable motor means for each of said clutch means for effecting the engagement of the associated clutch means, first pump means operatively connected to said motor means for pumping hydraulic fluid thereto, movable valve means operatively connected between said pump means and each of said motor means, control means operatively connected to each of said valve means and conditionable to effect movement of said valve means to a position in which a selected one of said motor means operates to cause engagement of the associated clutch means and conditionable to effect movement of said valve means to a position in which both of said motor means operates to cause engagement of the associated clutch means.

4. The combination of claim 1 and further including selectively engageable clutch means operatively connected in each of said separate torque transmitting means, hydraulically actuatable motor means for each of said clutch and for moving the associate clutch means into torque transmiting engagement, first pump means operatively connected to each of said motor means for supplying fluid to said motor means, separate valve means operatively connected between said pump means and each of said motor means to admit hydraulic fluid thereto or exhaust fluid therefrom, control means operatively connected to said valve means conditionable to shift said valve means to a position in which said pump means can supply fluid to both of said motor means and further conditionable to move said valve means to a position whereby fluid is directed only to a selected one of said motor means, and second pump means driven with said power transmission means for supplying fluid to said valve means and means responsive to drive of said first pump means to deactivate said first pump means.

5. In a dual engine power system, first and second engines, output means for said power system, power transmitting means operatively connecting said engines to said output means, electrically operated starter means for starting each of said engines, a source of electrical energy, circuit means for connecting said source with said starter means, said circuit means including first control means movable to a first position to complete a first circuit to a first of said starter means and movable to a second position to complete a second circuit to a second of said starter means and movable to a third position to complete both of said circuits to both of said starter means, torque demand control means for said engines, switch means operatively connected to said torque demand control means and to said circuit means for energizing the second of said starter means subsequent to movement of said torque demand control means to a predetermined position.

6. The dual engine power system of claim 5, said first control means including engine selector means and circuit switch means, a power clutch in each power transmitting means between each engine and said output means, pump means for supplying fluid to each of said power clutches, separate valve means disposed between said pump means and each said clutch means for directing fluid to and exhausting fluid from each said clutch means, and means operatively connecting each of said valve means to said first control means to effect the supply of fluid to or exhaust of fluid from said clutch means in response to movement of first control means to said first, second and third positions.

7. In a power system, first and second engines, output means driven by said engines, said second engine being a gas turbine engine with a gasifier section and a power section, power transmitting means defining a first power path connecting said first engine to said output means, power transmitting means defining a second power path connecting said power section to said output means, a third power path from said first engine to said gasifier section, selectively engageable and disengageable clutch means disposed in said third power path engageable to permit said first engine to supply power to said gasifier section and start said gas turbine engine while driving said output means.

8. The system defined in claim 7 wherein said third power path includes second output means, said last mentioned selectively engageable clutch means includes a friction clutch means for operatively connecting said third power path to said gasifier section to permit said gasifier section to drive said second output means when said power section is driving said first mentioned output means.

9. The system defined in claim 7 wherein said third power path includes a second output means, said last mentioned selectively engageable clutch means comprising first and second clutches for operatively connecting said first engine to said gasifier section, and wherein said second mentioned power transmitting means includes a selectively engageable friction clutch for controlling the transmittal of gas turbine engine power to said first output means.

10. In combination, first and second engines, an output for driving a transmission, first and second power transmitting means for respectively connecting said first and second engines to said output, separate selectively engageable clutch means in each of said power transmitting means, a second output, third selectively engageable clutch means for operatively connecting said first engine to said second output, control means for engaging and disengaging said first and third clutch means, fourth clutch means for connecting said second engine to said second output and additional control means for effecting the engagement of said fourth clutch means when only said second engine is driving said first output and for effecting the disengagement of said fourth clutch means when both of said engines are driving said first output.

11. The combination of claim 10 wherein said fourth clutch emans is a hydraulically actuated friction clutch, first fluid pump means for supplying fluid to said friction clutch, said additional control means comprising valve means for regulating fluid pressure to said fourth clutch means and being conditionable to exhaust fluid from said fourth clutch, said first mentioned control means being operatively connected to said valve means to condition said valve means to effect the disengagement of said fourth clutch means when said first and second clutch means are engaged.

12. The combination defined in claim 10, said first engine being a reciprocating engine and said second engine being a gas turbine engine having a gasifier section and a power section, said fourth clutch being selectively engageable to drivingly connect said reciprocating engine to said gasifier section to permit said reciprocating engine to drive said gasifier section up to a self-sustaining speed for starting said gas turbine engine.

References Cited

UNITED STATES PATENTS

| | | | |
|---|---|---|---|
| 2,541,625 | 2/1951 | Webster | 74—661 |
| 2,723,531 | 11/1955 | Wosika et al. | 60—39.15 |
| 3,133,416 | 5/1964 | Mock | 60—39.16 |
| 3,194,087 | 7/1965 | Krohogard | 60—6 X |
| 3,290,963 | 12/1966 | Oldfield et al. | 74—661 X |
| 3,388,684 | 6/1968 | Gros et al. | 60—11 X |

CARROLL B. DORITY, Jr., Primary Examiner

U.S. Cl. X.R.

60—11